United States Patent [19]

Scheppele

[11] 4,213,525
[45] Jul. 22, 1980

[54] FEED DELIVERY APPARATUS

[75] Inventor: Lyle W. Scheppele, Dubuque, Iowa

[73] Assignee: Toledo Stamping & Manufacturing Company, Toledo, Ohio

[21] Appl. No.: 883,498

[22] Filed: Mar. 6, 1978

[51] Int. Cl.² .............................................. B65G 47/34
[52] U.S. Cl. .................................... 198/364; 198/367; 198/597; 198/599; 198/635
[58] Field of Search .............. 198/364, 597, 599, 634, 198/637, 633, 367, 368, 635; 119/52 B, 52 R, 56 R

[56] References Cited

U.S. PATENT DOCUMENTS

| | | | |
|---|---|---|---|
| 2,537,005 | 1/1951 | Brown et al. | 198/367 X |
| 3,274,659 | 9/1966 | Baker | 198/599 X |
| 3,326,349 | 6/1967 | Pettis et al. | 198/597 X |
| 3,522,876 | 8/1970 | Purdy | 198/364 |

Primary Examiner—Robert B. Reeves
Assistant Examiner—Douglas D. Watts
Attorney, Agent, or Firm—Allen D. Gutchess, Jr.

[57] ABSTRACT

Apparatus is provided for delivering animal feed to animals and especially to feedbunks for cattle. The apparatus includes a carriage which travels back and forth over a conveyor belt which carries the feed along the feedbunk. The carriage has a plow and a deflector which engage feed and discharge it off one side of the belt or the other. The plow and deflector are located obliquely at angles to the belt so as to discharge all of the feed entirely off one side. An arm moves both the plow and the deflector from one oblique position to another when actuated by trip members located at predetermined positions along the belt. The deflector engages any feed not discharged by the plow and discharges it off the same side of the belt, and also cleans the belt.

2 Claims, 4 Drawing Figures

FEED DELIVERY APPARATUS

This invention relates to apparatus for delivering animal feed to animals and especially to cattle.

The best known prior art constitutes U.S. Pat. Nos. 3,306,261; 3,522,876; and my U.S. Pat. No. 3,672,334.

The feeder according to the invention is of the belt type which includes a conveyor belt transporting the animal feed directly from a silo or similar supply source along the length of a feedbunk. A carriage rides back and forth on the belt and has a plow which engages the feed and discharges it from either side of the belt into the feedbunk. The carriage discharges the feed when moving in both directions on the belt with the carriage moving more slowly than the belt when traveling in the same direction so that feed on the belt is moved into contact with the plow.

More specifically, the present invention provides an improvement in the arrangement for discharging the feed off either side of the belt. Heretofore, as disclosed in the above three patents, a shiftable plow or diverter was pivotally mounted on the carriage at a rear end portion of the plow and at a middle portion of the belt, with the forward end of the plow being shifted back and forth between edges of the belt. A stationary V-shaped deflector was positioned behind the plow with the apex of the deflector being positioned directly behind the pivot point at the rear end portion of the plow.

When the plow was positioned with the forward end at the left-hand side or edge of the belt, for example, the plow would engage and move the feed to the right-hand half of the belt. Upon further relative movement between the belt and the carriage, the feed would engage the right-hand half of the V-shaped deflector and be discharged off the right-hand edge of the belt. When the plow was shifted to the right-hand edge of the belt, a similar engagement of the plow and deflector discharged the feed from the left-hand edge of the belt. In either case, feed which would escape between the lower edge of the plow and the belt would then be engaged by the half of the deflector which was behind the plow with the result that feed would be discharged off the wrong edge of the belt, which was often undesirable because it would be delivered to the wrong animals.

Further, with the above arrangement, only half of the feed over the width would be engaged by the plow while all of it would be engaged and discharged off the belt by the one half of the deflector. With this full load being carried by only onehalf of the deflector, some feed was more apt to escape between the lower edge of that half and the belt and be carried to the end of the belt and discharged there rather than at the intended location.

The present invention provides feed delivery apparatus including a belt and a carriage operated in the same general manner as heretofore. A diverter or plow is pivotally mounted on the carriage above a middle portion of the belt and, in one position, extends obliquely completely across the belt from one edge to the other, being pivotable to another oblique position completely across the belt. A diverter or deflector is also pivotally mounted on the carriage behind the plow with the pivot point also being over a middle portion of the belt. The deflector, in one position, extends obliquely completely across the belt in one direction between the edges thereof and is pivotable to another position in which it extends obliquely completely across the belt in another direction. With this arrangement of the plow and the deflector, any feed escaping between the lower edge of the plow and the belt is discharged by the deflector off the same side of the belt as it would have been if discharged by the plow. Further, the entire length of the plow engages the feed so that there is less chance for the feed to escape under the plow than when the feed is concentrated at a lesser portion of the length, as has been true of the plows heretofore employed. In a preferred form, the plow and deflector are pivotally moved simultaneously to the same position by mechanism carried by the carriage to discharge the feed off only one side of the belt.

It is, therefore, a principal object of the invention to provide improved feed delivery apparatus capable of discharging the feed off only the desired side of the belt.

Another object of the invention is to provide feed delivery apparatus which is more effective in discharging feed off the side of a conveyor belt.

A further object of the invention is to provide feed delivery apparatus having a plow or diverter pivotally positioned at a midpoint over a middle portion of a belt carrying feed.

Yet another object of the invention is to provide feed delivery apparatus having a plow pivotally mounted at a midpoint above a middle portion of a belt with a deflector similarly mounted behind the plow, with both capable of extending completely across the belt in either of two oblique positions.

Many other objects and advantages of the invention will be apparent from the following detailed description of a preferred embodiment thereof, reference being made to the accompanying drawings, in which:

FIG. 4 is a fragmentary, detailed exploded view in perspective of a portion of the carriage.

Figure 1:
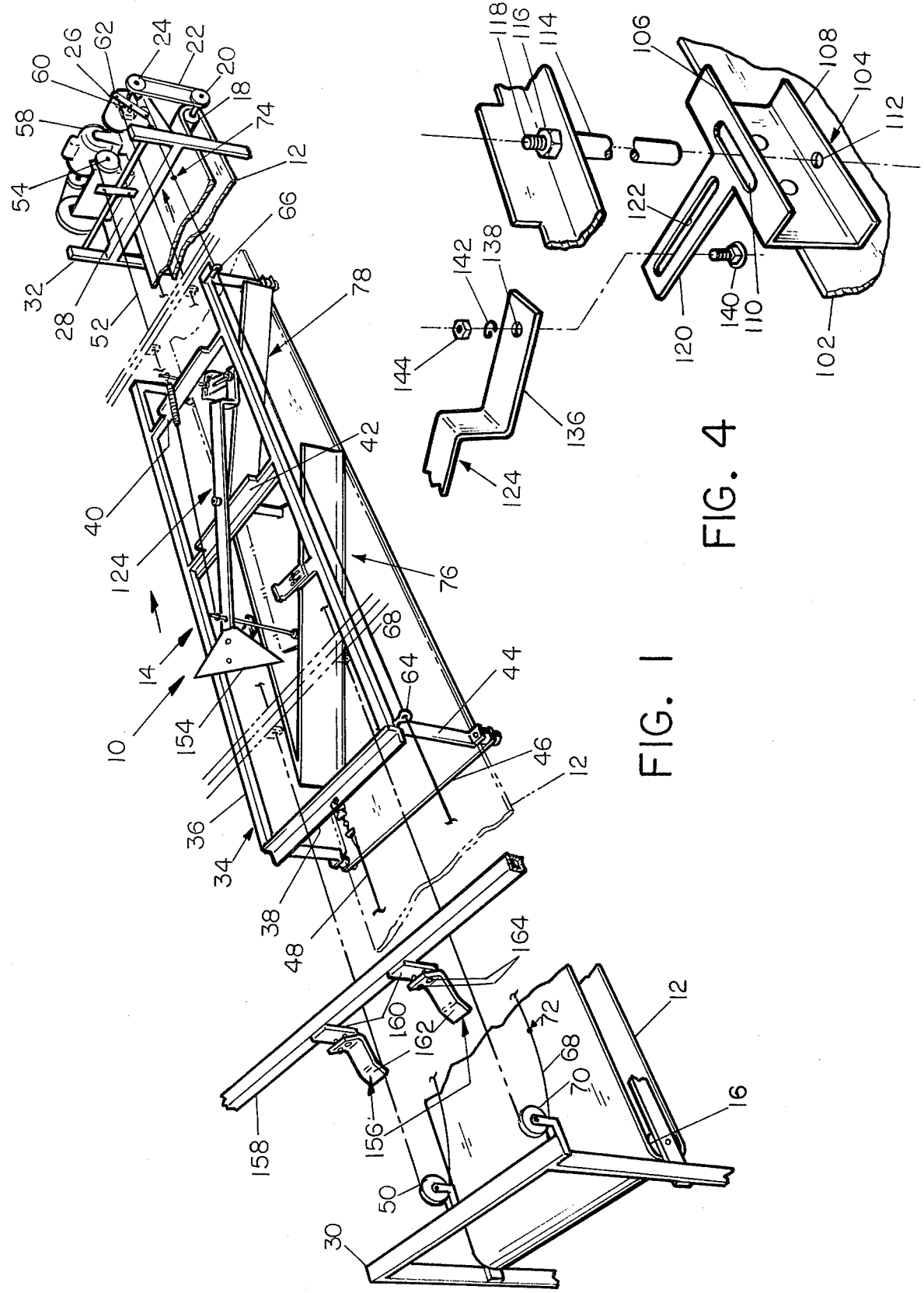
FIG. 1 is an overall view in perspective, with parts broken away, of feed delivery apparatus embodying the invention.

Referring to the drawings, and particularly to FIG. 1, a belt-type feeder embodying the invention is indicated at 10. The feeder 10 basically includes a belt 12 which is continuously moved in the direction of the arrows and carries feed therealong supplied at the charge or head end by suitable supply means (not shown). A carriage 14 moves back and forth over a substantial portion of the length of the belt 12 and includes discharge means for discharging the feed transversely off the belt and into a feedbunk trough (not shown) located therebelow. When the carriage 14 moves in the same direction as the belt 12 it moves more slowly than the belt so that the feed on the belt is carried into contact with the discharge means of the carriage and discharged off the side of the belt. When the carriage 14 moves in the direction opposite to that of the belt, toward the head end thereof, it contacts and discharges feed regardless of the velocity of the carriage, but with the rate of discharge depending on the carriage velocity. The belt 12 and the carriage 14 are suitably enclosed in side walls and a roof (not shown) to protect the structure and the feed from wind and weather.

The conveyor belt 12 extends around a head roll 16 at the head end of the conveyor and a tail roll 18 at the tail end. The tail roll 18 is driven through a driven pulley 20 by a V-belt 22 connected to a drive pulley 24 which, in turn, is driven by a suitable electric motor 26 located on a platform 28. The upper run of the belt is supported on a suitable bed or platform (not shown) with intermediate supporting rollers employed, if desired. The belt 12 and the rolls 16 and 18 are supported above the feedbunk trough by end frames 30 and 32 and additional intermediate cross frames.

The carriage 14 includes a framework 34 comprising side frame members 36, end frame members 38 and 40, and an intermediate frame member 42 which are all supported on upright frame members 44. The frame members 44, in turn, are affixed to and extend upwardly from outer edges of a bottom plate 46 with the upright members 44 being spaced outwardly from the edges of the belt 12.

For moving the carriage 14 back and forth over the belt 12, a cable 48 is connected to a central portion of the front end frame 38 and extends around an idler pulley 50 at the end frame 30. The cable 48 then is connected at an intermediate point (not shown) along the conveyor to a chain 52 which extends around a drive sprocket 54 at the power unit end of the conveyor and is connected through a wire 56 (FIG. 2) to the rear end of the carriage.

The drive sprocket 54 is driven by a reversible electric motor 58 which is controlled through a reversing switch 60 having an operating lever 62 thereon. The carriage has two eye bolts 64 and 66 through which a wire 68 extends, the wire leading around an idler pulley 70 at the supply end of the conveyor and having an upper end attached to the upper end of the lever 62 and a lower end attached to the lower end of it. An enlargement 72, which can be a cable clamp, is located on the wire 68 near the supply end of the conveyor and a similar enlargement 74 is located near the other end. When the carriage 14 moves toward the other end of the belt, as shown by the large arrow, the eye bolt 66 engages the enlargement 74 and rotates the lever 62 in a counterclockwise direction against a stop. This causes the motor 58 to reverse and move the carriage 14 toward the head end of the belt. When the eye bolt 64 engages the enlargement 72, it moves the lever 62 back to the position shown and reverses the motor 58 to once more move the carriage 14 toward the tail end of the belt.

In accordance with the invention, the carriage 14 employs both a diverter 76 and a rear deflector or diverter 78. The diverter 76 is shown as a V-shaped plow but it can also be a rotating brush extending across the belt 12 with the axis of rotation movable between two oblique positions to discharge the feed off either side of the belt. The plow 76 includes two blades 80 and 82 meeting at an apex or point 84 and diverging in a direction toward the tail end of the conveyor. Both of the blades 80 and 82 have lower lips or flanges 86 angled from the planes of the blades in a direction toward the head end of the conveyor. A horizontal plate 88 is affixed to both of the blades 80 and 82 to hold them in position with the plate 88 being located above the plane of the belt 12. A rear portion of the plate 88 has a notch 98 through which extends a pivot tube 100. The tube 100 has its lower end terminating below the plate 88 but above the belt 22 and has its upper end affixed, as by welding, to the intermediate frame member 42.

The deflector or diverter 78 comprises a single long blade 102 suitably affixed, as by bolts (not shown), to a bracket 104 at an intermediate point on the blade. The bracket 104 has upper and lower flanges 106 and 108 with the upper flange having an elongate slot 110 and the lower flange having a round opening 112. These loosely receive a pivot rod 114 which is affixed to the end frame member 40 by a nut 116 turned on an upper threaded end 118 of the pivot rod 114. The openings 110 and 112 are sufficiently large that the bracket and the deflector can readily move up and down relative to the pivot rod 114 and can move at an angle to some extent also. The bracket 104 also has an elongate tang 120 extending transversely thereto and to the blade 102 with a long slot 122 formed in the tang.

The plow 76 and the deflector 78 are designed to extend completely across the belt 22 in each of two oblique positions. When the plow is in the position shown in FIGS. 1 and 2, the blade 80 extends completely across the belt. When the plow is in the other oblique position, as shown in FIG. 3, the blade 82 extends completely across the belt. Thus, the feed on the belt 22 is contacted over the entire length of the blades 80 and 82 of the plow 76 to maximize distribution of the feed therealong and reduce the possibility of feed slipping between the blade and the belt.

Figure 2:
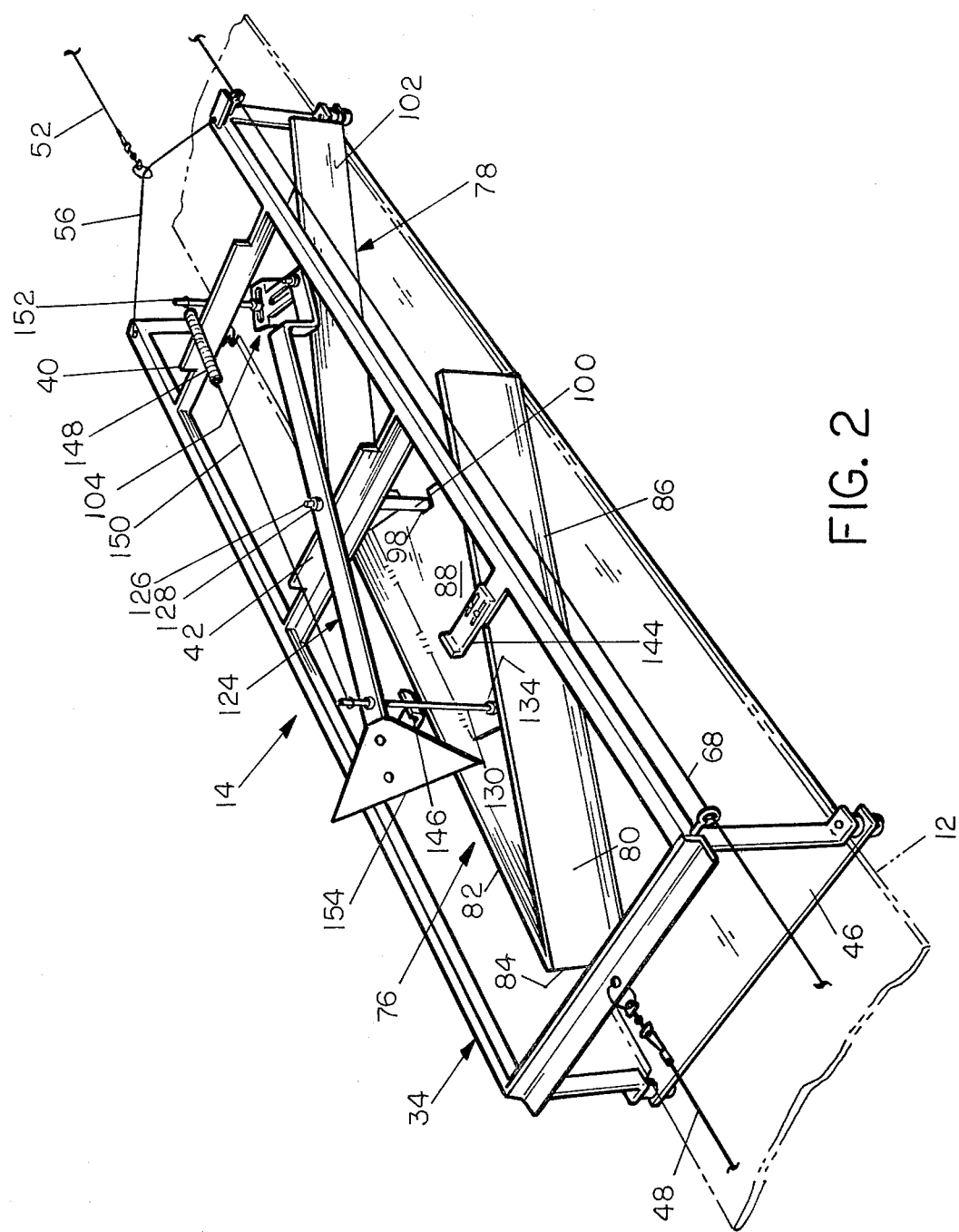
FIG. 2 is an enlarged view in perspective of a carriage of the apparatus.
Figure 3:
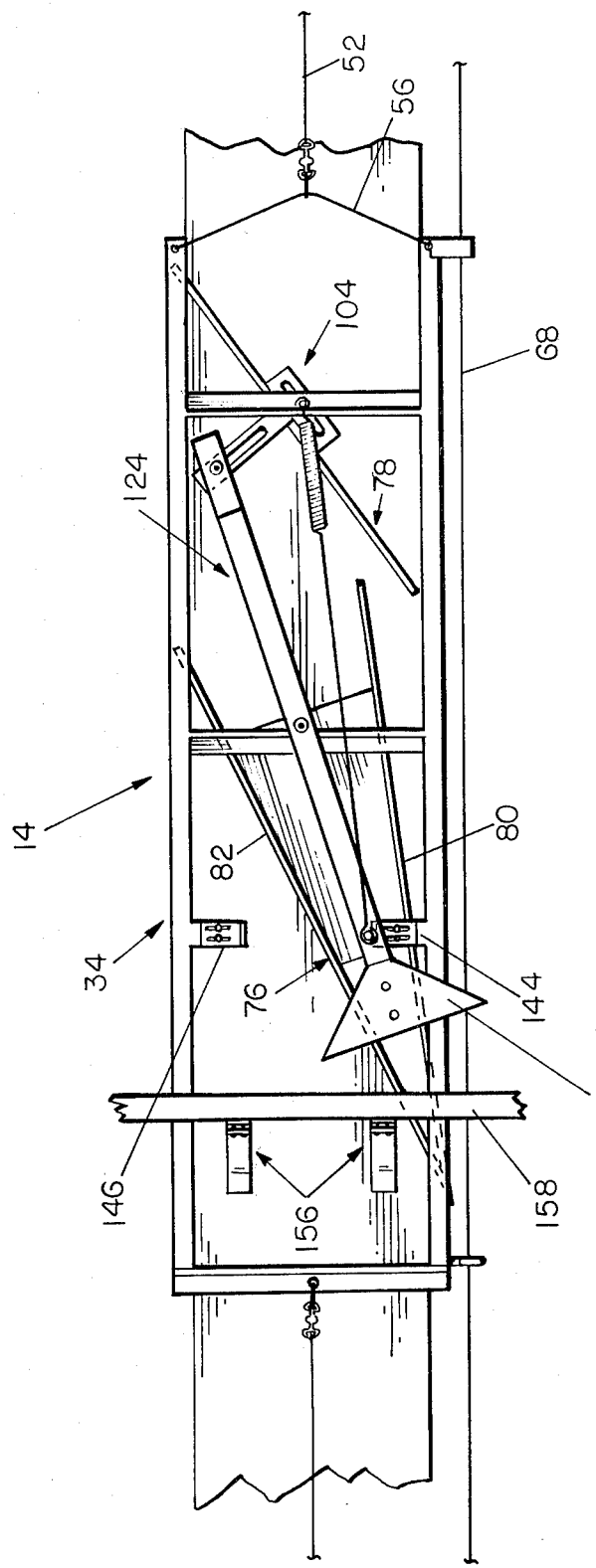
FIG. 3 is a plan view of the carriage with certain components in different positions.

The deflector 78 similarly extends obliquely completely across the belt when in the position of FIGS. 1 and 2 with the feed then being deflected off the same side of the belt as discharged by the plow 76. In the position of FIG. 3, the deflector again extends completely across the belt and deflects any feed slipping past the plow 76 off the same side of the belt as is discharged by the blade. The relatively sharp lower edge of the deflector 78 also is effective in cleaning the belt and substantially eliminating the possibility of feed slipping past both the plow 76 and the deflector 78 and falling off the end of the belt.

In a preferred form, the plow 76 and the deflector 78 are pivotally moved between their oblique positions on the belt at a predetermined location along the conveyor. This enables the feed to be discharged off one side or the other of the belt into a selected portion of the feedbunk. With both the plow and the deflector pivoted to the same position at the same time, the feed slipping past the plow and discharged by the deflector will by discharged from the same side of the belt as it would have been if discharged by the plow.

In order to pivot the plow 76 and the deflector 78, a lever arm 124 is pivotally mounted on top of the carriage 14. Specifically, the lever arm 124 is mounted on the intermediate frame member 42 on a threaded rod 126 extending upwardly from the pivot tube 100 and held by a nut 128. An actuating rod 130 is affixed to and extends downwardly from a forward end portion of the lever arm 124, being held by a nut 132. The rod 130 extends through an opening 134 in a forward portion of the plate 88 spaced a substantial distance from the tube 100 and the notch 98, toward the apex of the plow 76. Like the pivot tube 100, the rod 130 terminates above the belt 12.

The rear of the lever arm 124 has an offset portion 136 (FIG. 4) with a hole 138 therein. This portion of the arm is pivotally connected to the tang slot 122 by a shoulder bolt 140, a lock washer 142, and a nut 144.

The lever arm 124 is pivotally movable between two oblique positions which are determined when the actuating rod 130 contacts a stop 144 or a stop 146, which are adjustably supported by the side frame members 36, extending inwardly therefrom. When the lever arm 124 pivotally moves beyond a center position extending parallel to the longitudinal extent of the belt 12, it is urged toward the closer one of the stops 144 and 146 by an over-center spring 148. One end of the spring is attached to a wire 150 which is connected to a forward portion of the lever arm 124 in front of the pivot 126. Specifically, the wire is connected to an upper end of the actuating rod 130. The opposite end of the over-center spring 148 is connected to a central portion of the carriage 14 to the rear of the pivot 126 and specifically to a post 152 affixed to and extending upwardly from the end cross frame member 40. If desired, the post 152 can be an extension of the pivot rod 114.

To move the lever arm 124 between the two oblique positions, an actuator plate 154 is affixed to the forward end thereof in front of the rod 130. As shown in FIGS. 1 and 3, a pair of trip members 156 are located near the head end of the conveyor, in this instance, but can be located anywhere along the conveyor, being mounted on a cross frame member 158. The trip members include depending flanges 160 and generally horizontal trip tabs 162 which are loosely mounted on the flanges 160 by suitable fasteners 164.

When the carriage 14 is moving toward the head end of the conveyor, the actuator plate 154 merely slides under the appropriate trip tab 162 with which it is aligned. However, when the carriage 14 is moving in the other direction, toward the tail end of the conveyor, the rear slanted edge of the plate 154 moves up on the trip tab 162 and the plate, along with the lever arm 124, are then cammed away from that trip member toward the other one. However, as the actuator plate 154 is moved by the one tab, the other slanted edge misses the other trip tab with the lever arm 124 then moving past the center position and, through the action of the spring 148, moved until the rod 130 contacts the other of the stops 144 and 146. The lever arm 124 is then in the position shown in FIG. 3.

The plow 76 is also moved to the position of FIG. 3 since the actuator rod 130 forces the plow to that position, pivoting about the pivot tube 100. Similarly, the deflector 78 moves to the position of FIG. 3 due to the action of the lever arm on the tang 120 of the bracket 104. The plow 76 moves in a counterclockwise direction through a small angle when moving from the position of FIGS. 1 and 2 to the position of FIG. 3. The deflector 78, on the other hand, moves substantially through a 90° angle in a clockwise direction when moving from its position to FIGS. 1 and 2 to the position of FIG. 3. During this shifting movement, the blade 102 of the deflector 78 always extends completely across the belt so that no feed can slip past it.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. Feed delivery apparatus comprising a belt for carrying animal feed, a carriage positioned relative to said belt to contact feed carried therealong and effective to discharge the feed transversely thereof, said carriage comprising a plate having a width approximately equal to the width of said belt and being located under said belt, said carriage also having a frame supported by said plate and extending above said belt, a front diverter having an intermediate point pivotally carried by said frame above said plate and movable between two positions, in one of which said diverter extends obliquely across the width of said belt in one direction to discharge feed off one side of said belt and in the other of which said diverter extends obliquely across the width of said belt in another direction to discharge feed off the other side of said belt, a deflector having an intermediate point pivotally carried by said frame above said plate behind said diverter and movable between two positions, in one of which said deflector extends obliquely across the width of said belt in one direction to discharge the feed off one side of said belt and in the other of which said deflector extends obliquely across the width of said belt in another direction to carry feed off the other side of said belt, means for moving said carriage back and forth over a substantial portion of the length of said belt, and mechanical means pivotally carried by said carriage and connected with said diverter and connected to a slotted tang rigidly affixed to said deflector and extending substantially perpendicular thereto to substantially simultaneously move said diverter and said deflector from the oblique positions in which feed is discharged off said one side of said belt to the oblique positions in which feed is discharged off said other side of said belt.

2. Feed delivery apparatus comprising a belt for carrying animal feed, a carriage positioned relative to said belt to contact feed carried therealong and effective to discharge the feed transversely thereof, said carriage comprising a plate having a width approximately equal to the width of said belt and being located under said belt, said carriage also having a frame supported by said plate and extending above said belt, a front diverter having an intermediate point pivotally carried by said frame above said plate and movable between two positions, in one of which said diverter extends obliquely across the width of said belt in one direction to discharge feed off one side of said belt and in the other of which said diverter extends obliquely across the width of said belt in another direction to discharge feed off the other side of said belt, a deflector having an intermediate point pivotally carried by said frame above said plate behind said diverter and movable between two positions, in one of which said deflector extends obliquely across the width of said belt in one direction to discharge the feed off one side of said belt and in the other of which said deflector extends obliquely across the width of said belt in another direction to carry feed off the other side of said belt, means for moving said carriage back and forth over a substantial portion of the length of said belt, and mechanical means having a middle point pivotally carried by said carriage, having one end portion pivotally connected to said diverter at a portion spaced in front of its intermediate pivot point, and having a second end portion pivotally connected through a tang to said deflector to substantially simultaneously move said diverter and said deflector in opposite pivotal directions from the oblique positions in which feed is discharged off said one side of said belt to the oblique positions in which feed is discharged off said other side of said belt.

* * * * *